(12) United States Patent
Hung et al.

(10) Patent No.: US 9,760,119 B2
(45) Date of Patent: Sep. 12, 2017

(54) WEARABLE ELECTRONIC DEVICE

(71) Applicant: Acer Incorporated, New Taipei (TW)

(72) Inventors: Yew-Chung Hung, New Taipei (TW); Wen-Shu Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 15/089,288

(22) Filed: Apr. 1, 2016

(65) Prior Publication Data

US 2017/0123457 A1    May 4, 2017

(30) Foreign Application Priority Data

Oct. 29, 2015    (TW) .............................. 104135555 A (51) Int. Cl.
*G06F 1/16*    (2006.01)
*G04G 19/00*    (2006.01)

(52) U.S. Cl.
CPC ........... *G06F 1/1635* (2013.01); *G04G 19/00* (2013.01); *G06F 1/163* (2013.01)

(58) Field of Classification Search
CPC ........ G06F 1/163; G06F 1/1635; G06F 3/014; G06F 1/188; G06F 1/26; G04G 17/02; G04G 17/04; G04G 17/083; G04G 19/00; H05K 7/06
USPC ...................................... 361/679.03
See application file for complete search history.

(56) References Cited

U.S. PATENT DOCUMENTS

2015/0016035 A1* 1/2015 Tussy .................... G06F 1/1635
                                          361/679.03
2015/0212541 A1* 7/2015 Lu ......................... G04G 17/02
                                          361/679.03

\* cited by examiner

*Primary Examiner* — Anthony Haughton
*Assistant Examiner* — Ingrid Wright
(74) *Attorney, Agent, or Firm* — McClure, Qualey & Rodack, LLP (57) ABSTRACT

A wearable electronic device is provided, including a main body, a battery module and at least a wearing portion. The main body includes a housing, a battery module, and a through hole extended through the housing. The circuit module is disposed in the housing, the battery module is detachably received in the through hole, and the wearing portion is connected to the main body.

9 Claims, 15 Drawing Sheets

WEARABLE ELECTRONIC DEVICE

CROSS REFERENCE TO RELATED APPLICATIONS

The present application is based on, and claims priority from, Taiwan Patent Application No. 104135555, filed on Oct. 29, 2015, the disclosure of which is hereby incorporated by reference herein in its entirety.

BACKGROUND OF THE INVENTION

Field of the Invention

The application relates in general to a wearable electronic device, and in particular to a wearable electronic device having a replaceable battery.

Description of the Related Art

Wearable electronic devices are ever-changing, and many function-oriented wearable electronic devices such as smart watches and smart wristbands, which may have functions such as a Global Positioning System (GPS), heart rate sensor, pedometer, or wireless communication, have become popular. However, the more functions an electronic device has, the more power is needed. Due to the limitations of the small dimensions of wearable electronic devices, battery capacity is usually quite small, meaning that the battery may need to be charged many times per day. For at least this reason, how to design a wearable electronic device on which is easy to change the battery has become an important issue.

BRIEF SUMMARY OF INVENTION

To address the deficiencies of conventional electronic products, an embodiment of the invention provides a wearable electronic device, including a main body, a battery module, and at least a wearing portion. The main body includes a housing, a battery module, and a through hole, extended through the housing. The circuit module is disposed in the housing. The battery module is detachably received in the through hole. The wearing portion is connected to the main body.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the wearable electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
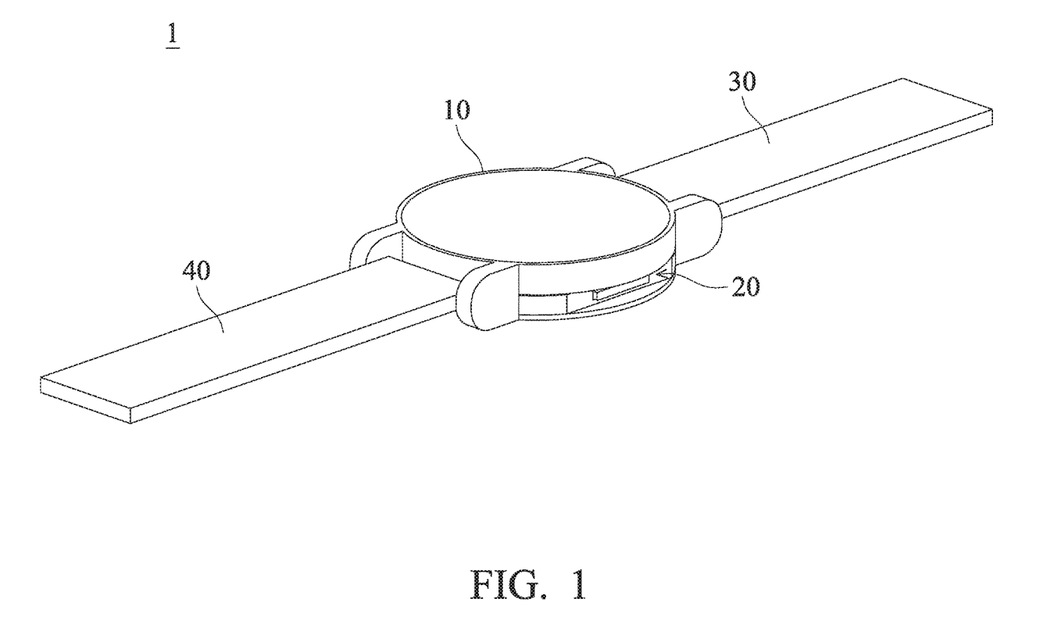
FIG. 1 is a schematic diagram of a wearable electronic device according to an embodiment of the invention.
Figure 2:
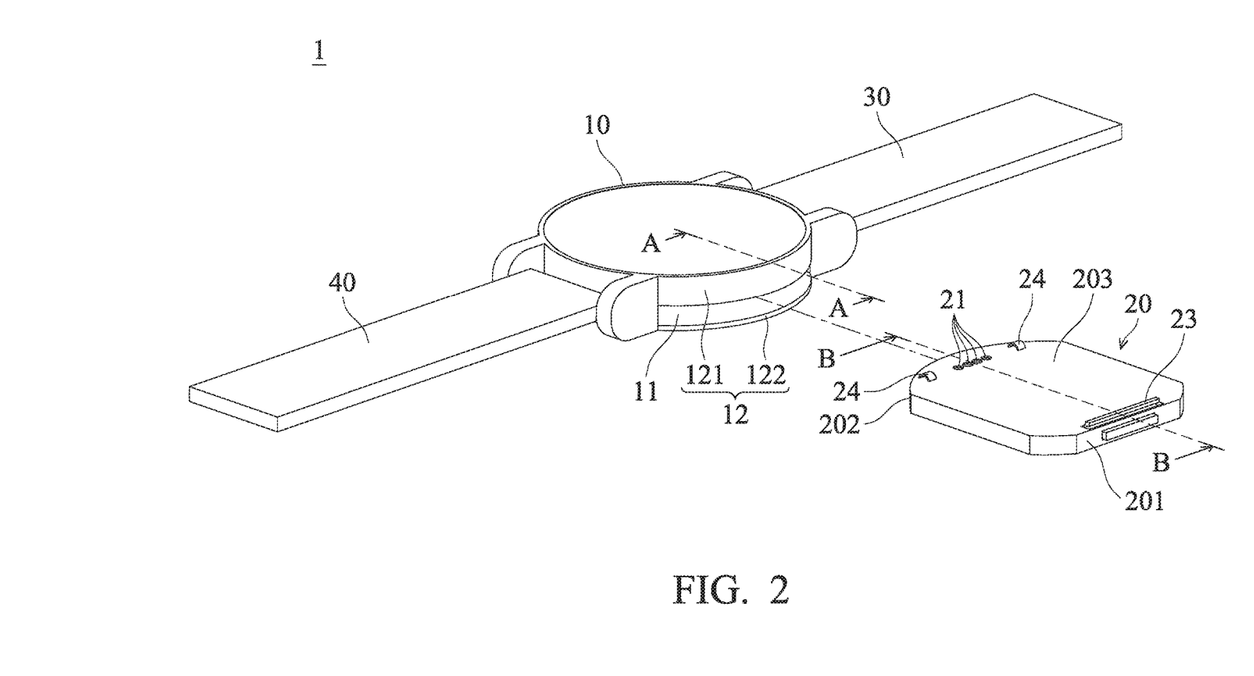
FIG. 2 is an exploded diagram of the wearable electronic device in FIG. 1.

Referring to FIGS. 1-2, FIG. 1 is a schematic diagram of a wearable electronic device 1 according to an embodiment of the invention, and FIG. 2 is an exploded-view diagram of the wearable electronic device 1 in FIG. 1. As shown in FIG. 1, the wearable electronic device 1, such as a smart watch, primarily comprises a main body 10, a battery module 20, and two wearing portions 30 and 40. As shown in FIG. 2, the main body 10 has a housing 12 and a circuit module (not shown) disposed in the hosing 12, wherein the housing 12 has a top portion 121 and a bottom portion 122. A through hole 11 is formed between the top portion 121 and the bottom portion 122 and extended through the housing 12. In this embodiment, the circuit module is disposed in the top portion 121 of the housing 12, which may include power management circuits, input/output interface circuits, screen display circuits, touch sensing circuits, video signal processing circuits, wireless communication circuits, etc. Furthermore, the circuit module can be connected to a gravity sensor, a movement detector, a heart rate sensor, a temperature sensor, or a GPS module (Global Positioning System module) for detecting signals pertaining to the user's movement, heart rate, or position, so as to help the user to record important physiological and environmental information in his or her daily life.

Figure 3:
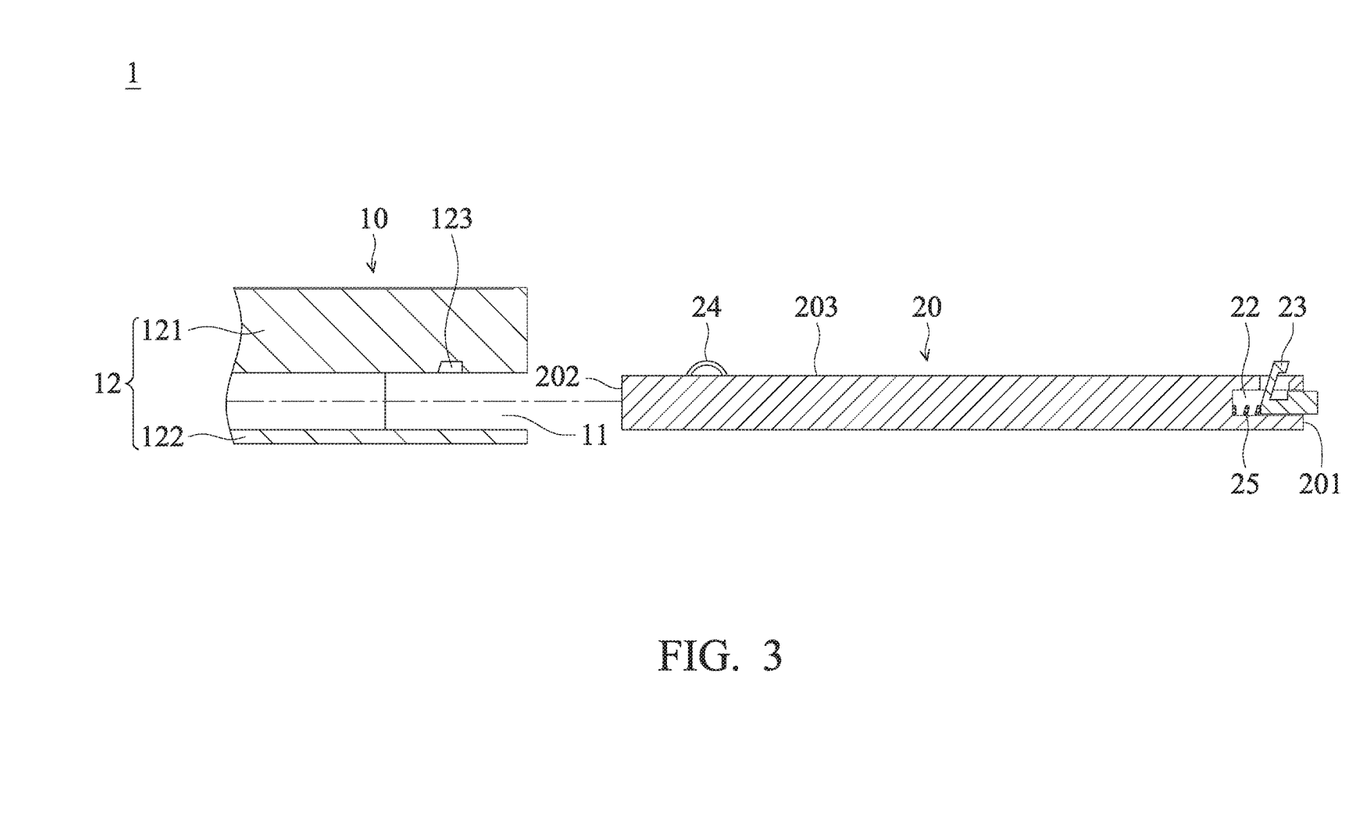
FIG. 3 is a partial cross-sectional view taken along lines A-A and B-B in FIG. 2.

Referring to FIGS. 2-3, FIG. 3 is a partial cross-sectional view taken along lines A-A and B-B in FIG. 2. As shown in FIGS. 2-3, a plurality of metal pads 21 (FIG. 2), a recessed portion 22, and a plurality of metal sheets 24 are formed on a surface 203 of the battery module 20, wherein the recessed portion 22 is near to a first side 201 of the battery module 20, and the metal sheets 24 are near to a second side 202 of the battery module 20. It is to be understood that a flexible member 23 (e.g., a plastic or metal sheet) is disposed in the recessed portion 22 of the battery module 20. The flexible member 23 protrudes from the first side 201 of the battery module 20 in a horizontal direction, and protrudes from the surface 203 upwardly in a vertical direction.

As shown in FIG. 3, a notch 123 is formed on the top portion 121 of the housing 12. In addition to the flexible member 23, an elastic member 25 (e.g., a spring) is also disposed in the recessed portion 22 of the battery module 20, wherein the elastic member 25 connects the battery module 20 with the flexible member 23.

Figure 4A:
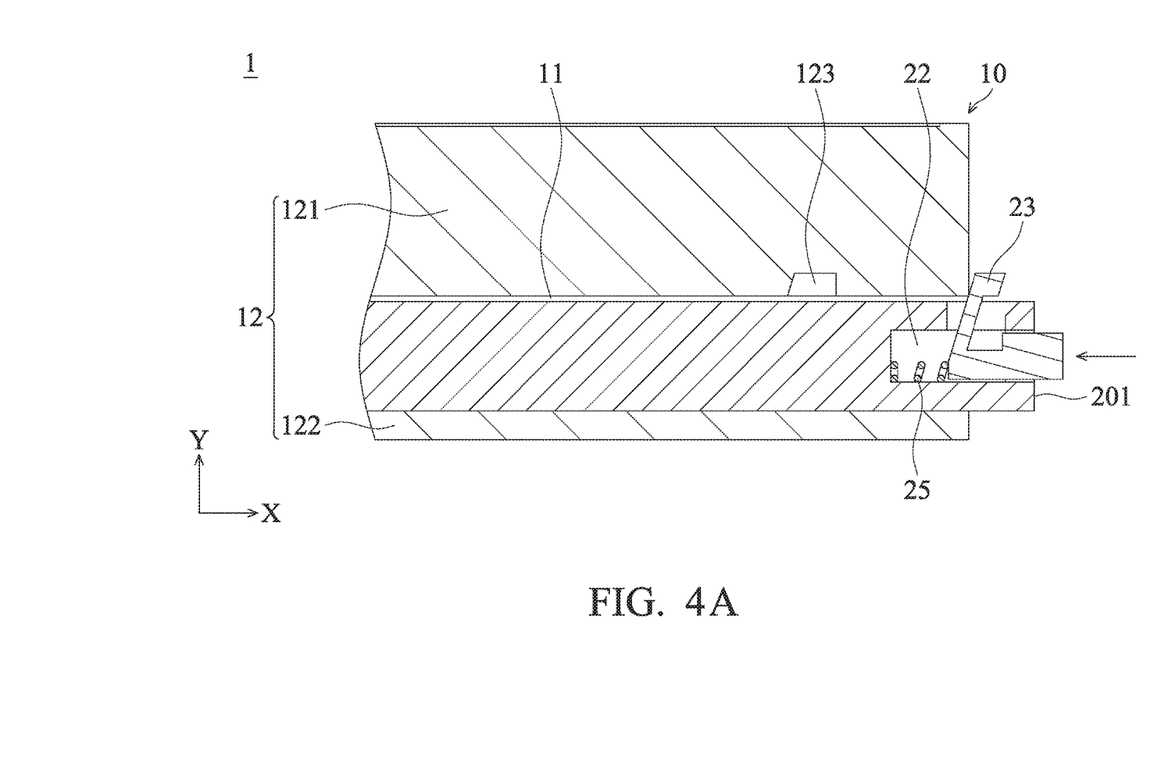
FIGS. 4A-4C are schematic diagrams of a main body assembled to a battery module according to an embodiment of the invention.
Figure 4B:
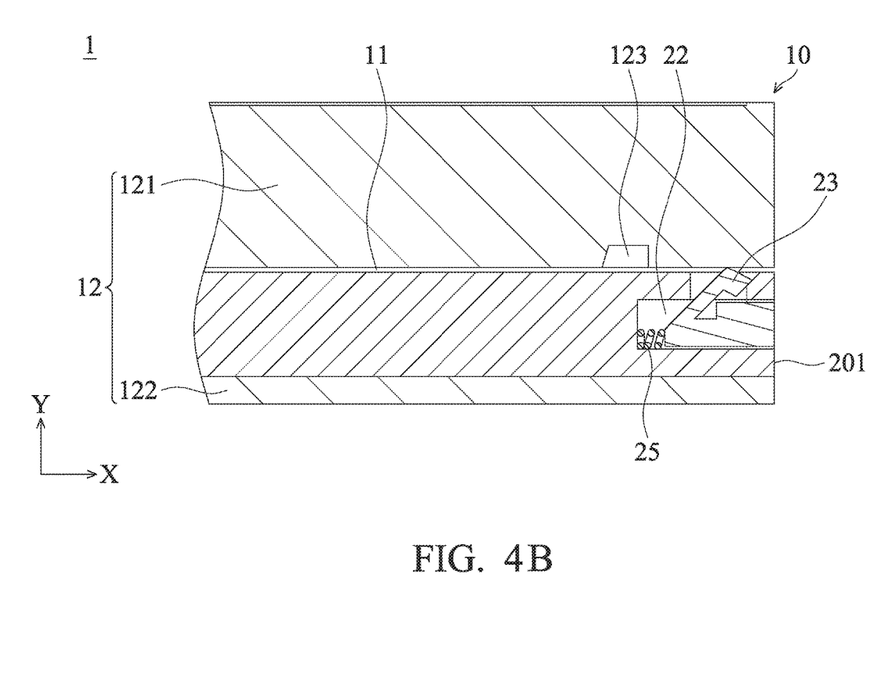
Figure 4C:
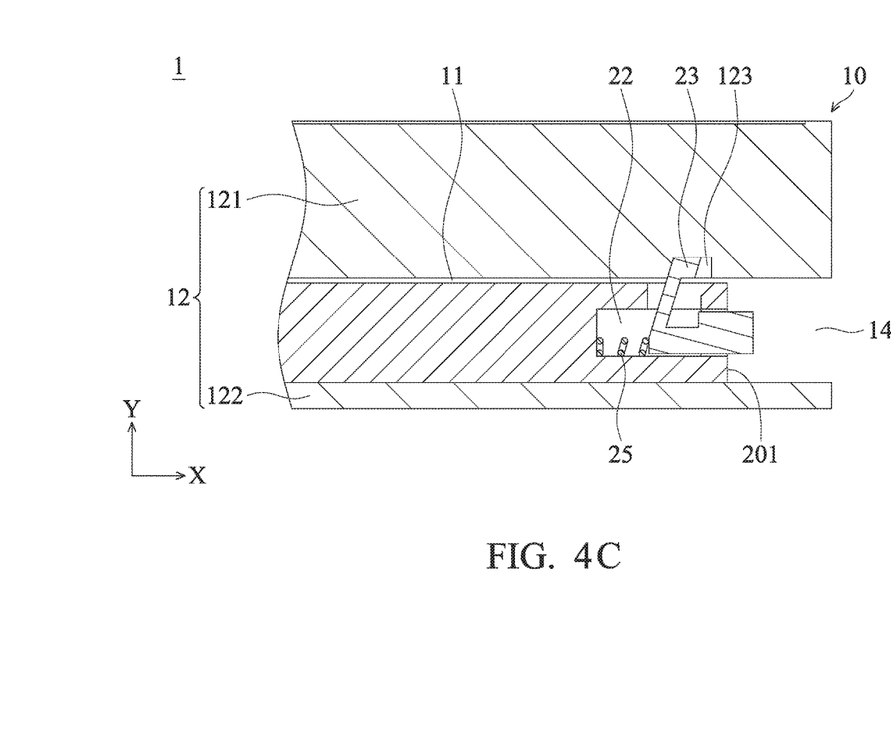

Please refer to FIGS. 4A-4C. To assemble the battery module 20 and the main body 10, a user can push the battery module 20 into the through hole 11 of the main body 10 (as the arrow indicates in FIG. 4A) in a first direction (-X direction). As shown in FIG. 4B, when the battery module 20 is pushed into the through hole 11 of the main body 10, the flexible member 23 in the recessed portion 22 of the battery module 20 is forced and deformed. Here, the flexible member 23 is pressed by an external force in a second direction (-Y direction), and the elastic member 25 is compressed in the first direction (-X direction) due to deformation of the flexible member 23. Accordingly, the battery module 20 is allowed to be inserted into the through hole 11. In FIG. 4C, when the battery module 20 keeps moving in the first direction (-X direction), an end of the flexible member 23 is engaged with the notch 123 on the top portion 121 of the housing 12, so that the battery module 20 is fixed in a joining position with respect to the main body 10, to accomplish the assembly of the battery module 20 and the main body 10.

In this embodiment, when the battery module 20 is in a joining position with respect to the main body 10, the metal sheets 24 on the battery module 20 are engaged with several cavities (not shown) on the top portion 121, so that the connection strength between the battery module 20 and the main body 10 can be enhanced, to prevent the battery module 20 from falling off from the main body 10. In addition, when the battery module 20 is in a joining position with respect to the main body 10, the battery module 20 can be electrically connected to the circuit module of the main body 10 by some electrical contacts (not shown) on the top portion 121, so that power can be supplied from the battery module 20 for the electronic device 1 to perform various functions.

Figure 4D:
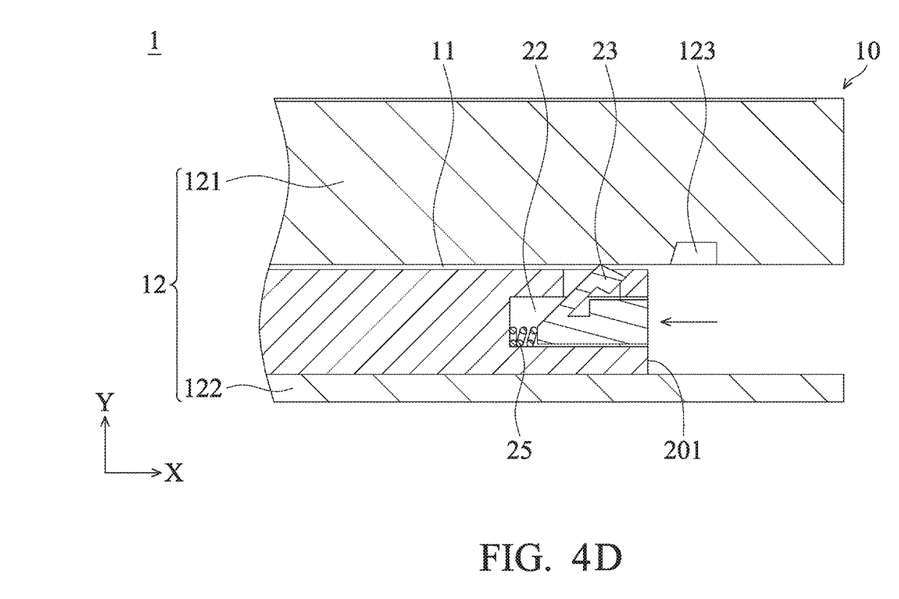
FIG. 4D is a schematic diagram the battery module detached from the main body.

Referring to FIG. 4D, to take off or replace the battery module 20, the user can use his or her hand or another battery module to push the flexible member 23 (as the arrow indicates in FIG. 4D) in the first direction (-X direction), so that the flexible member 23 is deformed due to the external force, and the battery module 20 can be detached from the main body 10. Accordingly, the user can replace or take off the battery module 20 from the main body 10.

It should be noted that, when the battery module 20 is in a joining position with respect to the main body 10 (FIG. 4C), an indentation 14 is formed between the top portion 121 and the bottom portion 122, so that the flexible member 23 would not be touched or pressed when using the electronic device 1, not only to prevent the battery module 20 from falling off the main body 10, but also to add to the aesthetic appearance of the wearable electronic device 1.

Figure 5:
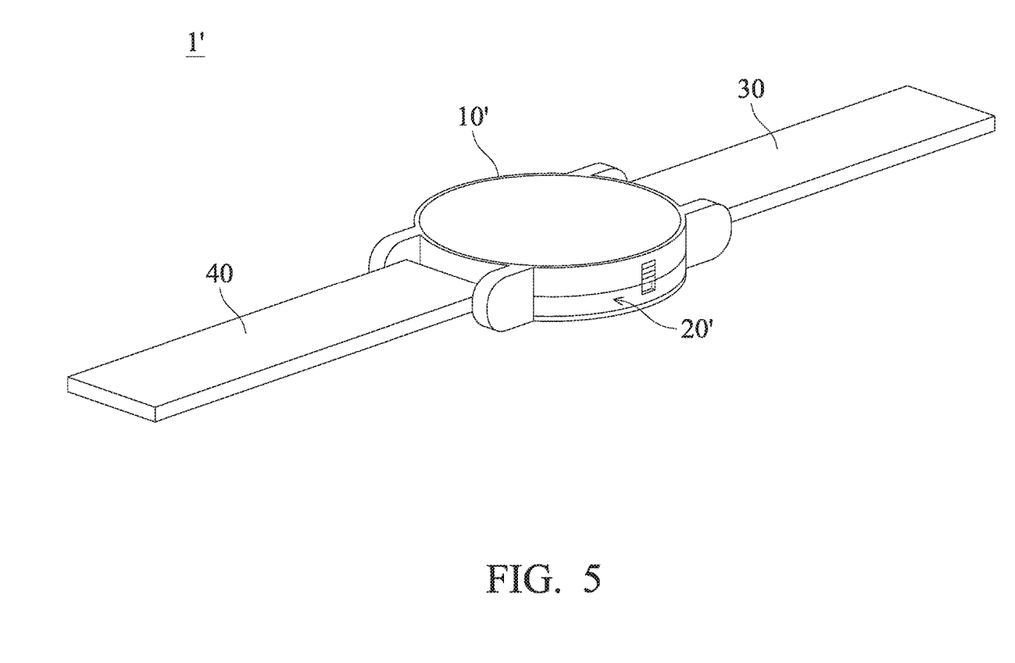
FIG. 5 is a schematic diagram of a wearable electronic device according to another embodiment of the invention.
Figure 6:
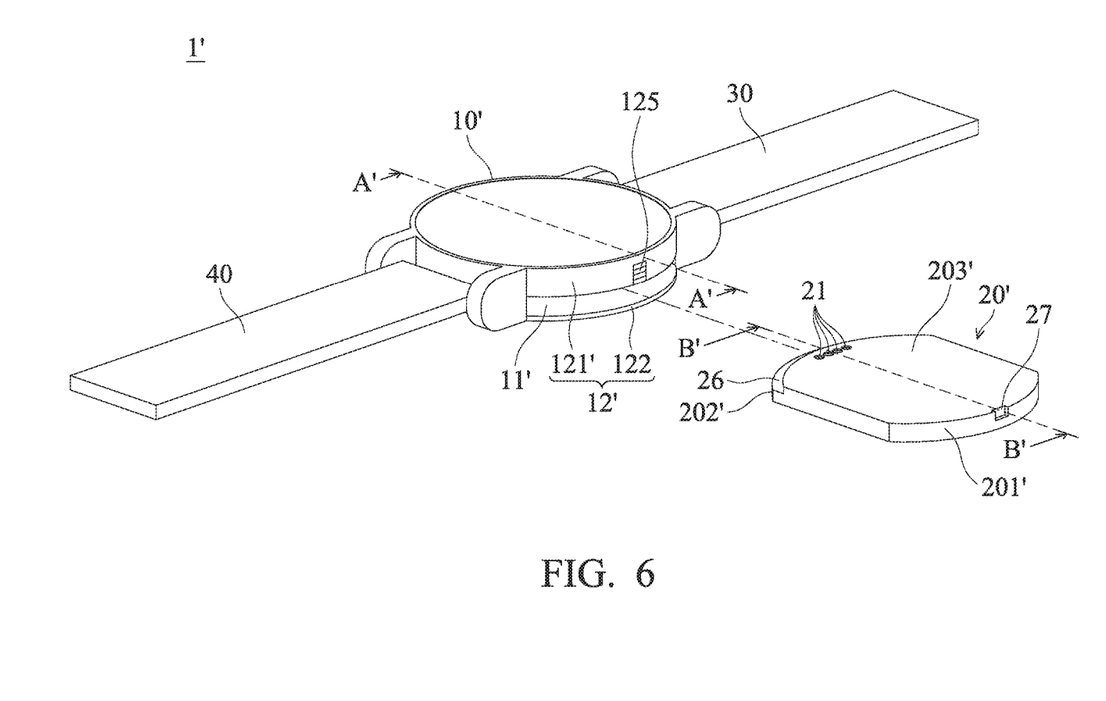
FIG. 6 is an exploded diagram of the wearable electronic device in FIG. 5.

FIG. 5 is a schematic diagram of a wearable electronic device 1' according to another embodiment of the invention, and FIG. 6 is an exploded diagram of the wearable electronic device 1' in FIG. 5. Referring to FIGS. 5-6, the electronic device 1' primarily comprises a main body 10', a battery module 20', and two wearing portions 30 and 40, wherein the wearing portions 30 and 40 are the same as the wearing portions 30 and 40 in the previous embodiment (FIG. 2). As shown in FIG. 6, the main body 10' has a through hole 11', a housing 12', and a circuit module (not show), wherein the housing 12' has a top portion 121' and a bottom portion 122', and the though hole 11' is formed between the top portion 121' and the bottom portion 122' and extended through the housing 12'.

Figure 7:
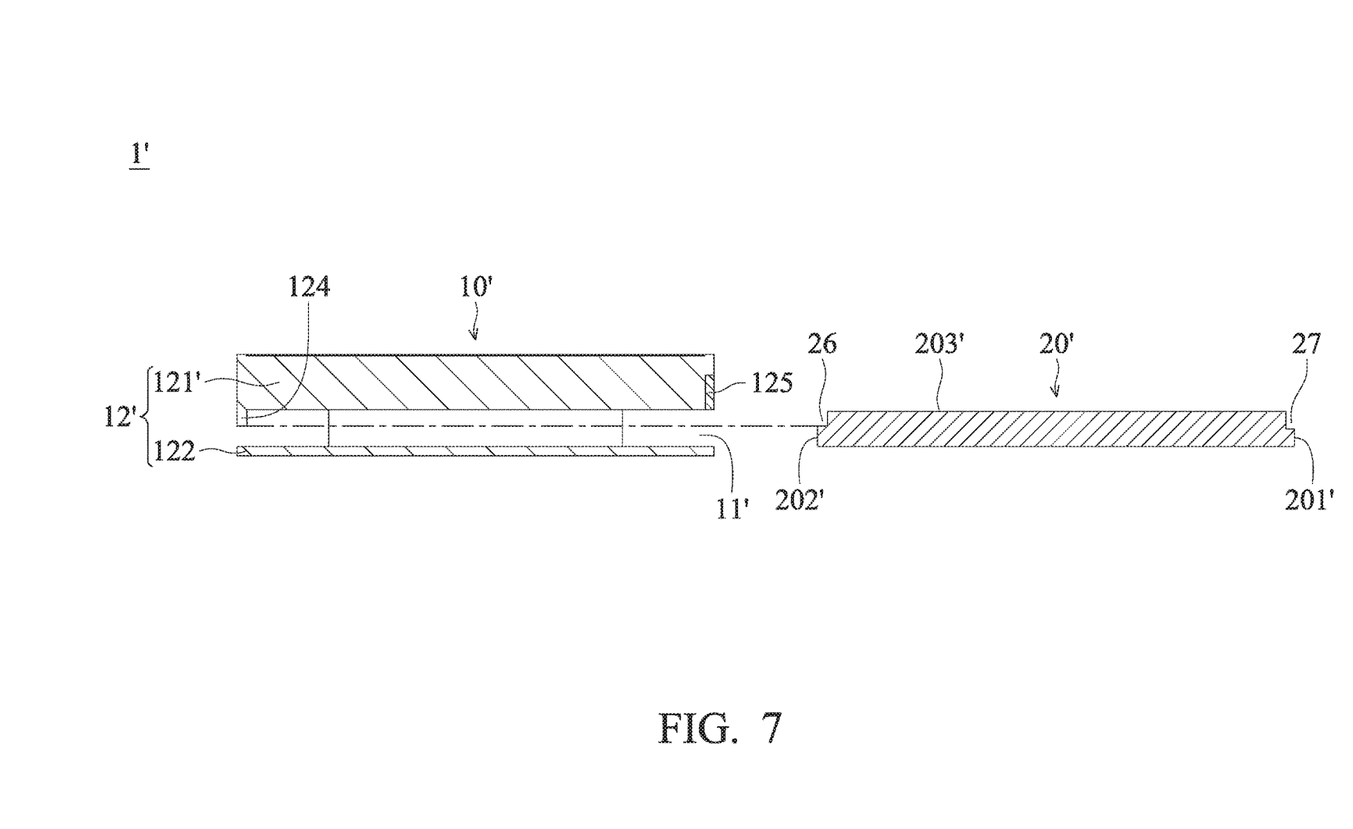
FIG. 7 is a partial cross-sectional view taken along lines A-A and B-B in FIG. 6.

Referring to FIGS. 6-7, FIG. 7 is a partial cross-sectional view taken along lines A-A and B-B in FIG. 6. The main difference between the wearable electronic device 1' in FIG. 7 and the wearable electronic device 1 in FIG. 3 is that the structures of the main body 10' and the battery module 20' are different from those of the main body 10 and the battery module 20. In this embodiment, the top portion 121' of the main body 10' has a stopper 124 and an engaging member 125, wherein the stopper 124 and the engaging member 125 are disposed on opposite sides of the top portion 121'. The battery module 20' has a first side 201' and a second side 202', wherein at least one metal pad 21, a groove 26, and a recess 27 are formed on a surface 203' of the battery module 20', and the groove 26 and the recess 27 are disposed on opposite sides of the battery module 20'. As shown in FIGS. 6-7, the groove 26 is formed on the first side 201', and the recess 27 is formed on the second side 202'.

Figure 8A:
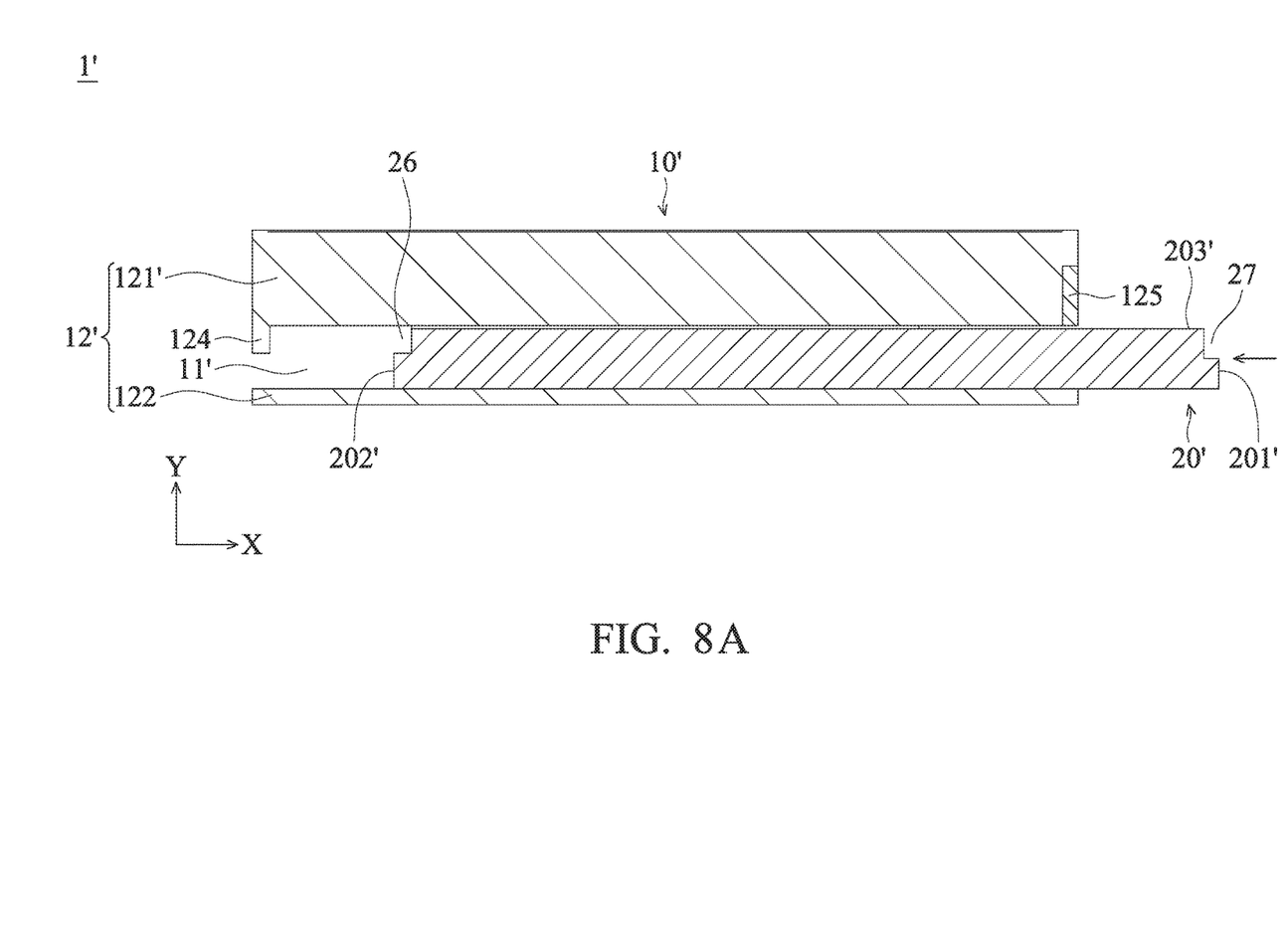
FIGS. 8A-8C are schematic diagrams of a main body assembled to a battery module according to another embodiment of the invention.
Figure 8B:
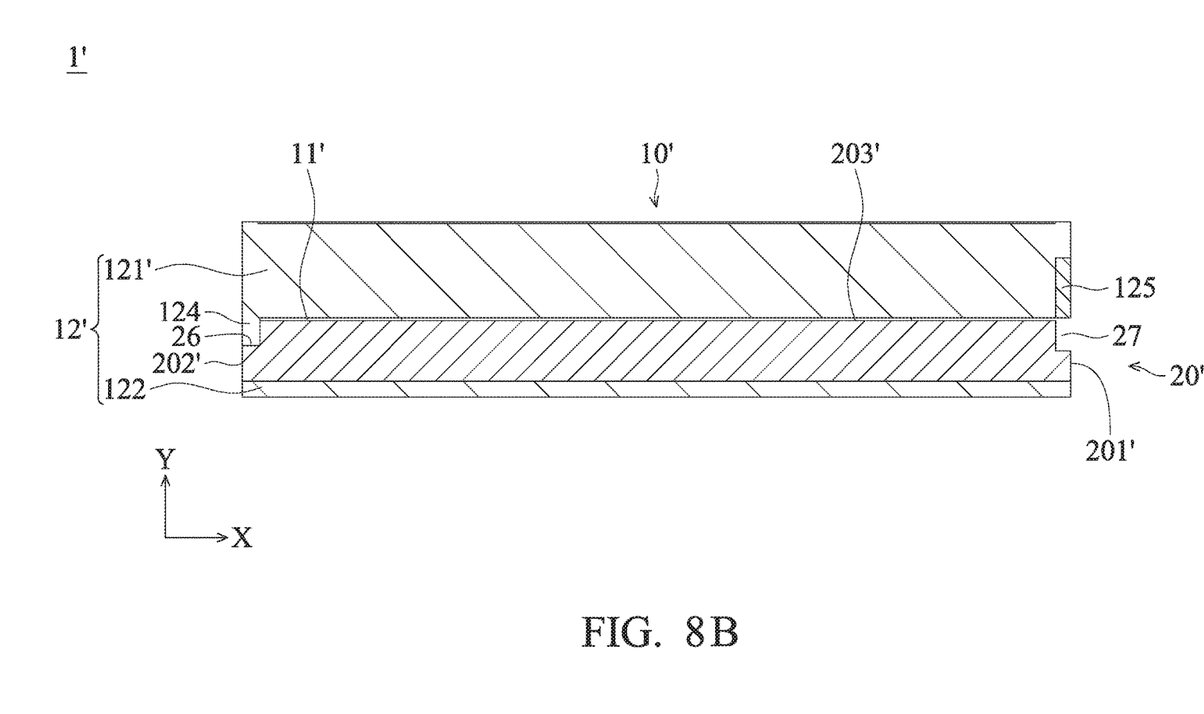
Figure 8C:
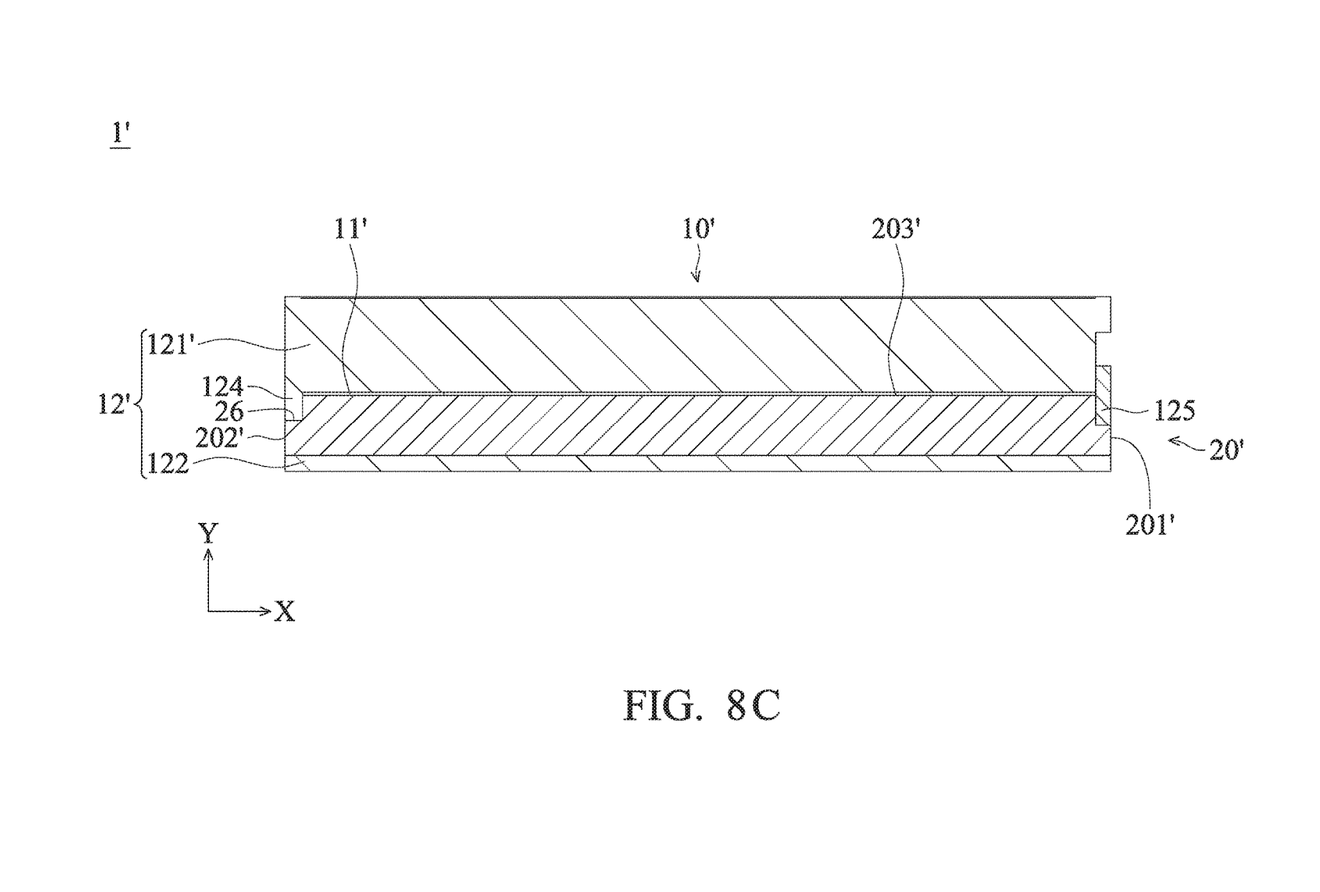

Referring to FIGS. 8A-8C, when assembling the main body 10' to the battery module 20', the user can push the battery module 20' into the through hole 11' of the main body 10' (FIG. 8) in the first direction (-X direction). With the battery module 20' being pushed in the first direction (-X direction), the stopper 124 of the top portion 121' of the housing 12' is engaged with the groove 26 of the battery module 20', to restrict the battery module 20' in the through hole 11'. In this state, the engaging member 125 on the housing 12' is aligned with the recess 27 of the battery module 20' (FIG. 8B). Subsequently, the user can push the engaging member 125 downwardly with respect to the top portion 121', so that the engaging member 125 is engaged with the recess 27 of the battery module 20' (FIG. 8C). Thus, the assembly of the battery module 20' and the main body 10' is achieved.

Figure 8D:
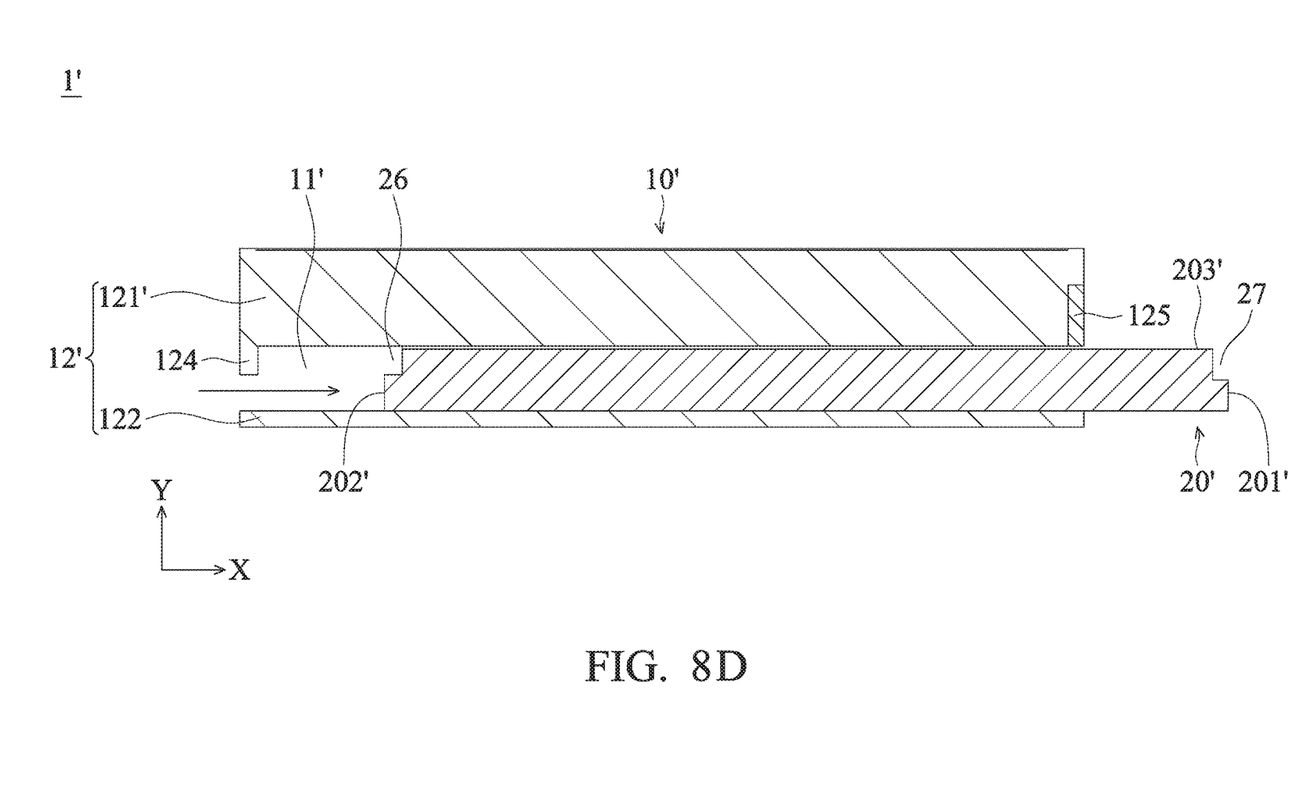
FIG. 8D is a schematic diagram of the battery module detached from the main body.

To detach the battery module 20' from the main body 10', the user can push the engaging member 125 upwardly, so that the engaging member 125 separates from the recess 27. Accordingly, the user can push the battery module 20' (as the arrow indicates in FIG. 8D) in the opposite direction from the first direction (X direction) from the second side 202' of the battery module 20'. Therefore, the battery module 20' is separated from the main body 10'.

Figure 9:
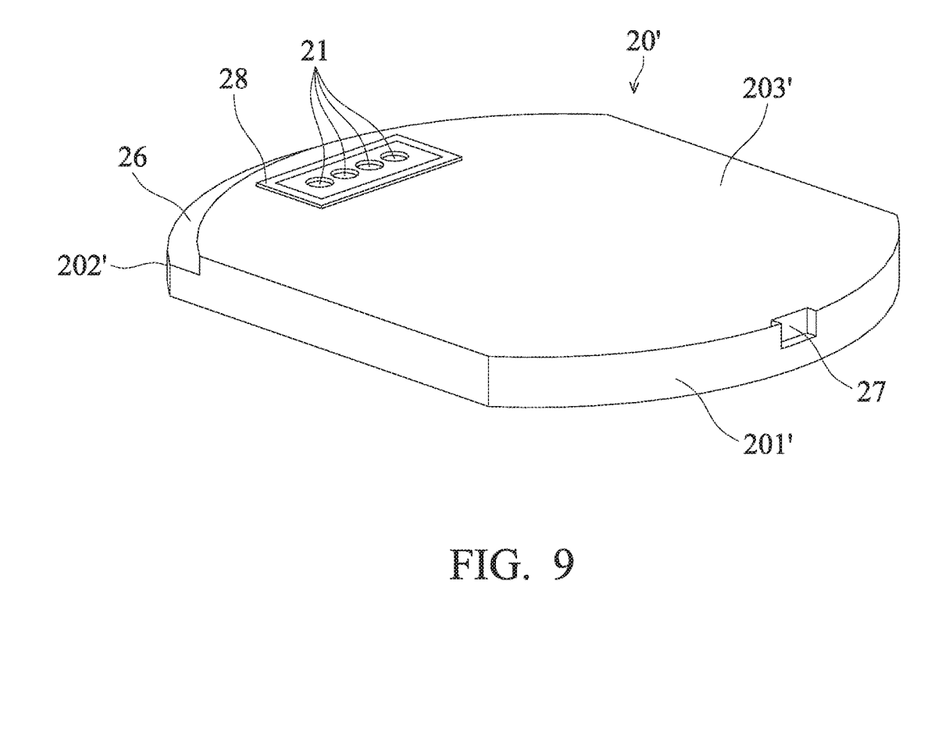
FIG. 9 is a schematic diagram of a battery module according to another embodiment of the invention.

FIG. 9 is a schematic diagram of a battery module 20" according to another embodiment of the invention. The main difference between the battery module 20" in FIG. 9 and the battery module 20' in FIGS. 6 is that the battery module 20" further has an elastic rubber member 28 disposed around the metal pads 21. When the battery module 20" is in the joining position with respect to the main body 10', the elastic rubber member 28 is in contact with the top portion 121' of the housing 12', so that the battery module 20"can be protected from water entry, short-circuits, and rust from the wearable electronic device. In some embodiments, only one soft or hard wearing portion may be provided to the wearable electronic device 1 or 1' embodiments for convenient usage.

In summary, a wearable electronic device is provided, comprising at least a wearing portion, a main body, and a battery module, wherein a through hole is formed in the main body for receiving the battery module, so that the easy and rapid assembly and detachment between the battery module and the main body can be achieved. Moreover, a user can replace or take off the battery module from the main body without taking off the whole wearable electronic device, so as to facilitate convenient usage.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A wearable electronic device, comprising:
   a main body, having a housing, a circuit module disposed in the housing, and a through hole extended through the housing;
   a battery module, detachably received in the through hole; and
   a wearing portion, connected to the main body, wherein the battery module has a recessed portion and a flexible member, the housing has a notch, and the flexible member is disposed in the recessed portion;
   wherein when the battery module is received in the through hole and in a joining position with respect to the main body, the battery module is electrically connected to the circuit module, and the flexible member engages with the notch.

2. The wearable electronic device as claimed in claim 1, wherein the battery module has a surface, and the flexible member protrudes from the surface in a horizontal direction.

3. The wearable electronic device as claimed in claim 1, wherein the battery module further has an elastic member disposed in the recessed portion and connected to the flexible member.

4. The wearable electronic device as claimed in claim 1, wherein when the battery module is received in the through hole and in the joining position with respect to the main body, the housing and the battery module form an indentation.

5. The wearable electronic device as claimed in claim 1, wherein the battery module enters the through hole in a first direction and leaves the through hole in the first direction.

6. A wearable electronic device, comprising:
   a main body, having a housing, a circuit module disposed in the housing, and a through hole extended through the housing;
   a battery module, detachably received in the through hole; and
   a wearing portion, connected to the main body, wherein the battery module has a recess, and the main body further has an engaging member moveably connected to the housing;
   wherein when the battery module is received in the through hole and in the joining position with respect to the main body, the battery module is electrically connected to the circuit module, and the engaging member is engaged with the recess.

7. The wearable electronic device as claimed in claim 6, wherein the battery module further has a groove, and the housing has a stopper;
   wherein when the battery module is received in the through hole and in the joining position with respect to the main body, the battery module is electrically connected to the circuit module, and the stopper is engaged with the groove.

8. The wearable electronic device as claimed in claim 7, wherein the battery module further has a first side and a second side opposite to the first side, the recess of the battery module is formed on the first side, and the groove is formed on the second side.

9. The wearable electronic device as claimed in claim 6, wherein the battery module enters the through hole in a first direction and leaves the through hole in a second direction which is opposite to the first direction.

* * * * *